(12) United States Patent
Tecza et al.

(10) Patent No.: US 9,551,349 B2
(45) Date of Patent: Jan. 24, 2017

(54) CIRCULATING DIELECTRIC OIL COOLING SYSTEM FOR CANNED BEARINGS AND CANNED ELECTRONICS

(75) Inventors: Joseph A. Tecza, Scio, NY (US); H. Allan Kidd, Vero Beach, FL (US)

(73) Assignee: Dresser-Rand Company, Olean, NY (US)

( * ) Notice: Subject to any disclaimer, the term of this patent is extended or adjusted under 35 U.S.C. 154(b) by 741 days.

(21) Appl. No.: 14/110,338

(22) PCT Filed: Mar. 29, 2012

(86) PCT No.: PCT/US2012/031240
§ 371 (c)(1),
(2), (4) Date: Feb. 12, 2014

(87) PCT Pub. No.: WO2012/138545
PCT Pub. Date: Oct. 11, 2012

(65) Prior Publication Data
US 2014/0154102 A1 Jun. 5, 2014

Related U.S. Application Data

(60) Provisional application No. 61/473,467, filed on Apr. 8, 2011.

(51) Int. Cl.
*H02K 7/09* (2006.01)
*B23Q 1/70* (2006.01)
(Continued)

(52) U.S. Cl.
CPC ............ *F04D 29/048* (2013.01); *F04D 17/12* (2013.01); *F04D 29/058* (2013.01); *F04D 29/58* (2013.01); *F04D 29/584* (2013.01)

(58) Field of Classification Search
CPC .......... H02K 7/09; F16C 37/005; F16C 39/02;
F16C 32/04; F16C 32/047; F04D 17/12;
F04D 23/003; F04D 29/058; F04D 29/58;
F04D 29/048; F04D 29/584; F04D
25/0606; B23Q 1/70; B23Q 11/127
See application file for complete search history.

(56) References Cited

U.S. PATENT DOCUMENTS 4,295,803 A * 10/1981 Barthelmess ........... B07B 7/083
415/10
5,191,811 A 3/1993 Kogure
(Continued)

FOREIGN PATENT DOCUMENTS

CA 2 647 511 10/2007
DE 44 19 364 A1 12/1995
(Continued)

OTHER PUBLICATIONS

Atlas Bronze, "Copper Alloys, Iron Alloys," Brochure, 2 pages.
(Continued)

*Primary Examiner* — Tran Nguyen

(57) ABSTRACT

A cooling system for a rotating machine, such as a centrifugal compressor. Specifically, the cooling system may be configured to cool radial and axial magnetic bearings in the rotating machine and the bearing control system that controls said bearings. The cooling system includes canned magnetic radial bearings on each end of the rotor and a canned bearing control system. The canned bearings and canned bearing control system may be filled with a dielectric cooling fluid and in fluid communication with each other via sealed conduits. Accordingly, the radial magnetic bearings and the bearing control system may be entirely immersed in the dielectric cooling fluid to regulate heat generation. An axial magnetic bearing may also be canned and fluidly coupled to the cooling system to immerse the axial magnetic bearing in the dielectric cooling fluid.

20 Claims, 5 Drawing Sheets

(51) Int. Cl.
  *F04D 29/048* (2006.01)
  *F04D 17/12* (2006.01)
  *F04D 29/058* (2006.01)
  *F04D 29/58* (2006.01)

(56) References Cited

U.S. PATENT DOCUMENTS

| | | |
|---|---|---|
| 5,201,587 A | 4/1993 | Springer |
| 5,202,024 A | 4/1993 | Andersson et al. |
| 5,202,026 A | 4/1993 | Lema |
| 5,203,891 A | 4/1993 | Lema |
| 5,207,810 A | 5/1993 | Sheth |
| 5,211,427 A | 5/1993 | Washizu |
| 5,215,384 A | 6/1993 | Maier |
| 5,215,385 A | 6/1993 | Ide |
| 5,219,232 A | 6/1993 | Adams et al. |
| 5,231,323 A | 7/1993 | New |
| 5,246,346 A | 9/1993 | Schiesser |
| 5,251,985 A | 10/1993 | Monzel |
| 5,267,798 A | 12/1993 | Budris |
| 5,272,403 A | 12/1993 | New |
| 5,273,249 A | 12/1993 | Peterson et al. |
| 5,285,123 A | 2/1994 | Kataoka et al. |
| 5,302,091 A | 4/1994 | Horiuchi |
| 5,306,051 A | 4/1994 | Loker et al. |
| 5,310,311 A | 5/1994 | Andres et al. |
| 5,311,432 A | 5/1994 | Momose |
| 5,337,779 A | 8/1994 | Fukuhara |
| 5,340,272 A | 8/1994 | Fehlau |
| 5,341,527 A | 8/1994 | Schmidt et al. |
| 5,345,127 A | 9/1994 | New |
| 5,347,190 A | 9/1994 | Lewis et al. |
| 5,355,040 A | 10/1994 | New |
| 5,355,042 A | 10/1994 | Lewis et al. |
| 5,356,226 A | 10/1994 | Onishi et al. |
| 5,378,121 A | 1/1995 | Hackett |
| 5,385,446 A | 1/1995 | Hays |
| 5,403,019 A | 4/1995 | Marshall |
| 5,421,655 A | 6/1995 | Ide et al. |
| 5,421,708 A | 6/1995 | Utter et al. |
| 5,425,345 A | 6/1995 | Lawrence et al. |
| 5,425,584 A | 6/1995 | Ide |
| 5,427,455 A | 6/1995 | Bosley |
| 5,443,581 A | 8/1995 | Malone |
| 5,445,013 A | 8/1995 | Clayton, Jr. et al. |
| 5,484,521 A | 1/1996 | Kramer |
| 5,494,448 A | 2/1996 | Johnson et al. |
| 5,495,221 A | 2/1996 | Post |
| 5,496,394 A | 3/1996 | Nied |
| 5,500,039 A | 3/1996 | Mori et al. |
| 5,509,782 A | 4/1996 | Streeter |
| 5,514,924 A | 5/1996 | McMullen et al. |
| 5,521,448 A | 5/1996 | Tecza et al. |
| 5,525,034 A | 6/1996 | Hays |
| 5,525,146 A | 6/1996 | Straub |
| 5,531,811 A | 7/1996 | Kloberdanz |
| 5,538,259 A | 7/1996 | Uhrner et al. |
| 5,542,831 A | 8/1996 | Scarfone |
| 5,547,287 A | 8/1996 | Zeidan |
| 5,575,309 A | 11/1996 | Connell |
| 5,585,000 A | 12/1996 | Sassi |
| 5,593,232 A | 1/1997 | Maier |
| 5,601,155 A | 2/1997 | Gardner |
| 5,605,172 A | 2/1997 | Schubert et al. |
| 5,616,976 A | 4/1997 | Fremerey et al. |
| 5,628,623 A | 5/1997 | Skaggs |
| 5,630,881 A | 5/1997 | Ogure et al. |
| 5,634,492 A | 6/1997 | Steinruck et al. |
| 5,640,472 A | 6/1997 | Meinzer et al. |
| 5,641,280 A | 6/1997 | Timuska |
| 5,642,944 A | 7/1997 | Dublin, Jr. et al. |
| 5,645,399 A | 7/1997 | Angus |
| 5,651,616 A | 7/1997 | Hustak et al. |
| 5,653,347 A | 8/1997 | Larsson |
| 5,664,420 A | 9/1997 | Hays |
| 5,669,717 A | 9/1997 | Kostrzewsky |
| 5,682,759 A | 11/1997 | Hays |
| 5,683,185 A | 11/1997 | Buse |
| 5,683,235 A | 11/1997 | Welch |
| 5,685,691 A | 11/1997 | Hays |
| 5,687,249 A | 11/1997 | Kato |
| 5,693,125 A | 12/1997 | Dean |
| 5,693,994 A | 12/1997 | New |
| 5,703,424 A | 12/1997 | Dorman |
| 5,709,528 A | 1/1998 | Hablanian |
| 5,713,720 A | 2/1998 | Barhoum |
| 5,714,818 A | 2/1998 | Eakman et al. |
| 5,720,799 A | 2/1998 | Hays |
| 5,738,356 A | 4/1998 | Marshall |
| 5,738,445 A | 4/1998 | Gardner |
| 5,743,654 A | 4/1998 | Ide et al. |
| 5,749,700 A | 5/1998 | Henry et al. |
| 5,750,040 A | 5/1998 | Hays |
| 5,752,774 A | 5/1998 | Heshmat et al. |
| 5,759,011 A | 6/1998 | Moll |
| 5,775,882 A | 7/1998 | Kiyokawa et al. |
| 5,779,619 A | 7/1998 | Borgstrom et al. |
| 5,791,868 A | 8/1998 | Bosley et al. |
| 5,795,135 A | 8/1998 | Nyilas et al. |
| 5,797,990 A | 8/1998 | Li |
| 5,800,092 A | 9/1998 | Nill et al. |
| 5,803,612 A | 9/1998 | Bättig |
| 5,810,485 A | 9/1998 | Dublin, Jr. et al. |
| 5,810,558 A | 9/1998 | Streeter |
| 5,827,040 A | 10/1998 | Bosley et al. |
| 5,848,616 A | 12/1998 | Vogel et al. |
| 5,850,857 A | 12/1998 | Simpson |
| 5,853,585 A | 12/1998 | Nesseth |
| 5,863,023 A | 1/1999 | Evans et al. |
| 5,866,518 A | 2/1999 | Dellacorte et al. |
| 5,899,435 A | 5/1999 | Mitsch et al. |
| 5,927,720 A | 7/1999 | Zinsmeyer et al. |
| 5,935,053 A | 8/1999 | Strid et al. |
| 5,938,803 A | 8/1999 | Dries |
| 5,938,819 A | 8/1999 | Seery |
| 5,946,915 A | 9/1999 | Hays |
| 5,948,030 A | 9/1999 | Miller et al. |
| 5,951,066 A | 9/1999 | Lane et al. |
| 5,957,656 A | 9/1999 | De Long |
| 5,965,022 A | 10/1999 | Gould et al. |
| 5,967,746 A | 10/1999 | Hagi et al. |
| 5,971,702 A | 10/1999 | Afton et al. |
| 5,971,907 A | 10/1999 | Johannemann et al. |
| 5,977,677 A | 11/1999 | Henry et al. |
| 5,980,218 A | 11/1999 | Takahashi et al. |
| 5,988,524 A | 11/1999 | Odajima et al. |
| 6,011,829 A | 1/2000 | Panasik |
| 6,035,934 A | 3/2000 | Stevenson et al. |
| 6,036,435 A | 3/2000 | Oklejas |
| 6,059,539 A | 5/2000 | Nyilas et al. |
| 6,068,447 A | 5/2000 | Foege |
| 6,078,120 A | 6/2000 | Casaro et al. |
| 6,090,174 A | 7/2000 | Douma et al. |
| 6,090,299 A | 7/2000 | Hays et al. |
| 6,095,690 A | 8/2000 | Niegel |
| 6,111,333 A | 8/2000 | Takahashi et al. |
| 6,113,675 A | 9/2000 | Branstetter |
| 6,122,915 A | 9/2000 | Hays |
| 6,123,363 A | 9/2000 | Burgard et al. |
| 6,135,639 A | 10/2000 | Dede |
| 6,145,844 A | 11/2000 | Waggott |
| 6,149,825 A | 11/2000 | Gargas |
| 6,151,881 A | 11/2000 | Ai et al. |
| 6,155,720 A | 12/2000 | Bättig |
| 6,191,513 B1 | 2/2001 | Chen et al. |
| 6,194,801 B1 | 2/2001 | Göransson |
| 6,196,809 B1 | 3/2001 | Takahashi et al. |
| 6,196,962 B1 | 3/2001 | Purvey et al. |
| 6,206,202 B1 | 3/2001 | Galk et al. |
| 6,214,075 B1 | 4/2001 | Filges et al. |
| 6,217,637 B1 | 4/2001 | Toney et al. |
| 6,227,379 B1 | 5/2001 | Nesseth |
| 6,232,688 B1 | 5/2001 | Ress, Jr. et al. |
| 6,244,749 B1 | 6/2001 | Nakagawa et al. |

(56) References Cited

U.S. PATENT DOCUMENTS

| | | |
|---|---|---|
| 6,255,752 B1 | 7/2001 | Werner |
| 6,277,278 B1 | 8/2001 | Conrad et al. |
| 6,309,174 B1 | 10/2001 | Oklejas, Jr. et al. |
| 6,310,414 B1 | 10/2001 | Agahi et al. |
| 6,312,021 B1 | 11/2001 | Thomas |
| 6,314,738 B1 | 11/2001 | Hays |
| 6,353,272 B1 | 3/2002 | van der Hoeven |
| 6,353,273 B1 | 3/2002 | Heshmat et al. |
| 6,367,241 B1 | 4/2002 | Ress, Jr. et al. |
| 6,372,006 B1 | 4/2002 | Pregenzer et al. |
| 6,375,437 B1 | 4/2002 | Nolan |
| 6,383,262 B1 | 5/2002 | Marthinsen et al. |
| 6,390,789 B1 | 5/2002 | Grob et al. |
| 6,394,764 B1 | 5/2002 | Samurin |
| 6,398,400 B1 | 6/2002 | Nienhaus |
| 6,398,973 B1 | 6/2002 | Saunders et al. |
| 6,402,385 B1 | 6/2002 | Hayakawa et al. |
| 6,402,465 B1 | 6/2002 | Maier |
| 6,426,010 B1 | 7/2002 | Lecoffre et al. |
| 6,464,469 B1 | 10/2002 | Grob et al. |
| 6,467,988 B1 | 10/2002 | Czachor et al. |
| 6,468,426 B1 | 10/2002 | Klass |
| 6,485,536 B1 | 11/2002 | Masters |
| 6,530,484 B1 | 3/2003 | Bosman |
| 6,530,979 B2 | 3/2003 | Firey |
| 6,531,066 B1 | 3/2003 | Saunders et al. |
| 6,537,035 B2 | 3/2003 | Shumway |
| 6,540,917 B1 | 4/2003 | Rachels et al. |
| 6,547,037 B2 | 4/2003 | Kuzdzal |
| 6,592,654 B2 | 7/2003 | Brown |
| 6,596,046 B2 | 7/2003 | Conrad et al. |
| 6,599,086 B2 | 7/2003 | Soja |
| 6,607,348 B2 | 8/2003 | Jean |
| 6,609,882 B2 | 8/2003 | Urlichs |
| 6,616,719 B1 | 9/2003 | Sun et al. |
| 6,617,731 B1 | 9/2003 | Goodnick et al. |
| 6,617,733 B1 | 9/2003 | Yamauchi et al. |
| 6,629,825 B2 | 10/2003 | Stickland et al. |
| 6,631,617 B1 | 10/2003 | Dreiman et al. |
| 6,637,942 B2 | 10/2003 | Dourlens et al. |
| 6,658,986 B2 | 12/2003 | Pitla et al. |
| 6,659,143 B1 | 12/2003 | Taylor et al. |
| 6,666,134 B2 | 12/2003 | Gusching et al. |
| 6,669,845 B2 | 12/2003 | Klass |
| 6,688,802 B2 | 2/2004 | Ross et al. |
| 6,707,200 B2 | 3/2004 | Carroll et al. |
| 6,718,955 B1 | 4/2004 | Knight |
| 6,719,830 B2 | 4/2004 | Illingworth et al. |
| 6,764,284 B2 | 7/2004 | Oehman, Jr. |
| 6,770,993 B1 | 8/2004 | Heshmat et al. |
| 6,776,812 B2 | 8/2004 | Komura et al. |
| 6,802,693 B2 | 10/2004 | Reinfeld et al. |
| 6,802,881 B2 | 10/2004 | Illingworth et al. |
| 6,810,311 B2 | 10/2004 | Winner et al. |
| 6,811,713 B2 | 11/2004 | Arnaud |
| 6,817,846 B2 | 11/2004 | Bennitt |
| 6,837,913 B2 | 1/2005 | Schilling et al. |
| 6,843,836 B2 | 1/2005 | Kitchener |
| 6,846,158 B2 | 1/2005 | Hull |
| 6,878,187 B1 | 4/2005 | Hays et al. |
| 6,893,208 B2 | 5/2005 | Frosini et al. |
| 6,907,933 B2 | 6/2005 | Choi et al. |
| 6,957,945 B2 | 10/2005 | Tong et al. |
| 6,966,746 B2 | 11/2005 | Cardenas et al. |
| 6,979,358 B2 | 12/2005 | Ekker et al. |
| 6,987,339 B2 | 1/2006 | Adams et al. |
| 7,001,448 B1 | 2/2006 | West |
| 7,004,719 B2 | 2/2006 | Baldassarre et al. |
| 7,013,978 B2 | 3/2006 | Appleford et al. |
| 7,018,104 B2 | 3/2006 | Dourlens et al. |
| 7,022,150 B2 | 4/2006 | Borgstrom et al. |
| 7,022,153 B2 | 4/2006 | McKenzie |
| 7,025,890 B2 | 4/2006 | Moya |
| 7,033,410 B2 | 4/2006 | Hilpert et al. |
| 7,033,411 B2 | 4/2006 | Carlsson et al. |
| 7,048,495 B2 | 5/2006 | Osgood |
| 7,056,363 B2 | 6/2006 | Carlsson et al. |
| 7,063,465 B1 | 6/2006 | Wilkes et al. |
| 7,112,036 B2 | 9/2006 | Lubell et al. |
| 7,131,292 B2 | 11/2006 | Ikegami et al. |
| 7,144,226 B2 | 12/2006 | Pugnet et al. |
| 7,159,723 B2 | 1/2007 | Hilpert et al. |
| 7,160,518 B2 | 1/2007 | Chen et al. |
| 7,169,305 B2 | 1/2007 | Gomez |
| 7,185,447 B2 | 3/2007 | Arbeiter |
| 7,204,241 B2 | 4/2007 | Thompson et al. |
| 7,240,583 B2 | 7/2007 | Wingett et al. |
| 7,241,392 B2 | 7/2007 | Maier |
| 7,244,111 B2 | 7/2007 | Suter et al. |
| 7,258,713 B2 | 8/2007 | Eubank et al. |
| 7,264,430 B2 | 9/2007 | Bischof et al. |
| 7,270,145 B2 | 9/2007 | Koezler |
| 7,288,202 B2 | 10/2007 | Maier |
| 7,314,560 B2 | 1/2008 | Yoshida et al. |
| 7,323,023 B2 | 1/2008 | Michele et al. |
| 7,328,749 B2 | 2/2008 | Reitz |
| 7,335,313 B2 | 2/2008 | Moya |
| 7,352,090 B2 | 4/2008 | Gustafson et al. |
| 7,367,713 B2 | 5/2008 | Swann et al. |
| 7,377,110 B2 | 5/2008 | Sheridan et al. |
| 7,381,235 B2 | 6/2008 | Koene et al. |
| 7,396,373 B2 | 7/2008 | Lagerstedt et al. |
| 7,399,412 B2 | 7/2008 | Keuschnigg |
| 7,403,392 B2 | 7/2008 | Attlesey et al. |
| 7,429,811 B2 | 9/2008 | Palazzolo et al. |
| 7,435,290 B2 | 10/2008 | Lane et al. |
| 7,445,653 B2 | 11/2008 | Trautmann et al. |
| 7,470,299 B2 | 12/2008 | Han et al. |
| 7,473,083 B2 | 1/2009 | Oh et al. |
| 7,479,171 B2 | 1/2009 | Cho et al. |
| 7,494,523 B2 | 2/2009 | Oh et al. |
| 7,501,002 B2 | 3/2009 | Han et al. |
| 7,517,155 B2 | 4/2009 | Stout et al. |
| 7,520,210 B2 | 4/2009 | Theodore, Jr. et al. |
| 7,575,422 B2 | 8/2009 | Bode et al. |
| 7,578,863 B2 | 8/2009 | Becker et al. |
| 7,591,882 B2 | 9/2009 | Harazim |
| 7,594,941 B2 | 9/2009 | Zheng et al. |
| 7,594,942 B2 | 9/2009 | Polderman |
| 7,610,955 B2 | 11/2009 | Irwin, Jr. |
| 7,628,836 B2 | 12/2009 | Barone et al. |
| 7,637,699 B2 | 12/2009 | Albrecht |
| 7,674,377 B2 | 3/2010 | Crew |
| 7,677,308 B2 | 3/2010 | Kolle |
| 7,694,540 B2 | 4/2010 | Ishida et al. |
| 7,703,290 B2 | 4/2010 | Bladon et al. |
| 7,703,432 B2 | 4/2010 | Shaffer |
| 7,708,537 B2 | 5/2010 | Bhatia et al. |
| 7,708,808 B1 | 5/2010 | Heumann |
| 7,744,663 B2 | 6/2010 | Wallace |
| 7,748,079 B2 | 7/2010 | McDowell et al. |
| 7,766,989 B2 | 8/2010 | Lane et al. |
| 7,811,344 B1 | 10/2010 | Duke et al. |
| 7,811,347 B2 | 10/2010 | Carlsson et al. |
| 7,815,415 B2 | 10/2010 | Kanezawa et al. |
| 7,824,458 B2 | 11/2010 | Borgstrom et al. |
| 7,824,459 B2 | 11/2010 | Borgstrom et al. |
| 7,836,601 B2 | 11/2010 | El-Shafei |
| 7,846,228 B1 | 12/2010 | Saaski et al. |
| 7,850,427 B2 | 12/2010 | Peer et al. |
| 7,884,521 B2 | 2/2011 | Buhler et al. |
| 7,963,160 B2 | 6/2011 | Bisgaard |
| 8,006,544 B2 | 8/2011 | Holmes et al. |
| 8,061,970 B2 | 11/2011 | Maier et al. |
| 8,109,168 B2 | 2/2012 | Wurm et al. |
| 8,118,570 B2 | 2/2012 | Meacham et al. |
| 8,182,153 B2 | 5/2012 | Singh et al. |
| 8,191,410 B2 | 6/2012 | Hansen et al. |
| 8,283,825 B2 | 10/2012 | Maier |
| 8,353,633 B2 | 1/2013 | Griffin |
| 8,535,022 B2 | 9/2013 | Takei et al. |
| 2002/0009361 A1 | 1/2002 | Reichert et al. |
| 2002/0197150 A1 | 12/2002 | Urlichs |
| 2003/0029318 A1 | 2/2003 | Firey |

(56) References Cited

U.S. PATENT DOCUMENTS

| | | |
|---|---|---|
| 2003/0035718 A1 | 2/2003 | Langston et al. |
| 2003/0136094 A1 | 7/2003 | Illingworth et al. |
| 2003/0212476 A1 | 11/2003 | Aanen et al. |
| 2004/0007261 A1 | 1/2004 | Cornwell |
| 2004/0024565 A1 | 2/2004 | Yu et al. |
| 2004/0047526 A1 | 3/2004 | DeWachter et al. |
| 2004/0061500 A1 | 4/2004 | Lou et al. |
| 2004/0086376 A1 | 5/2004 | Baldassarre et al. |
| 2004/0101395 A1 | 5/2004 | Tong et al. |
| 2004/0117088 A1 | 6/2004 | Dilger |
| 2004/0170505 A1 | 9/2004 | Lenderink et al. |
| 2004/0179961 A1 | 9/2004 | Pugnet et al. |
| 2004/0189124 A1 | 9/2004 | Baudelocque et al. |
| 2005/0008271 A1 | 1/2005 | Lee |
| 2005/0106015 A1 | 5/2005 | Osgood |
| 2005/0173337 A1 | 8/2005 | Costinel |
| 2006/0065609 A1 | 3/2006 | Arthur |
| 2006/0090430 A1 | 5/2006 | Trautman et al. |
| 2006/0096933 A1 | 5/2006 | Maier |
| 2006/0140747 A1 | 6/2006 | Vandervort et al. |
| 2006/0157251 A1 | 7/2006 | Stinessen et al. |
| 2006/0157406 A1 | 7/2006 | Maier |
| 2006/0177166 A1 | 8/2006 | Stadlmayr et al. |
| 2006/0186671 A1 | 8/2006 | Honda et al. |
| 2006/0193728 A1 | 8/2006 | Lindsey et al. |
| 2006/0204153 A1 | 9/2006 | Alam et al. |
| 2006/0222515 A1 | 10/2006 | Delmotte et al. |
| 2006/0230933 A1 | 10/2006 | Harazim |
| 2006/0239831 A1 | 10/2006 | Garris |
| 2006/0254659 A1 | 11/2006 | Bellott et al. |
| 2006/0275160 A1 | 12/2006 | Leu et al. |
| 2007/0029091 A1 | 2/2007 | Stinessen et al. |
| 2007/0036476 A1 | 2/2007 | Lane et al. |
| 2007/0036646 A1 | 2/2007 | Nguyen et al. |
| 2007/0041846 A1* | 2/2007 | Bosen ................... F01D 15/005 417/228 |
| 2007/0051245 A1 | 3/2007 | Yun |
| 2007/0051576 A1 | 3/2007 | Shimoda et al. |
| 2007/0062374 A1 | 3/2007 | Kolle |
| 2007/0065317 A1 | 3/2007 | Stock |
| 2007/0084340 A1 | 4/2007 | Dou et al. |
| 2007/0122265 A1 | 5/2007 | Ansari et al. |
| 2007/0131715 A1 | 6/2007 | Minard et al. |
| 2007/0140870 A1 | 6/2007 | Fukanuma et al. |
| 2007/0151922 A1 | 7/2007 | Mian |
| 2007/0163215 A1 | 7/2007 | Lagerstadt |
| 2007/0172363 A1 | 7/2007 | Laboube et al. |
| 2007/0196215 A1 | 8/2007 | Frosini et al. |
| 2007/0227969 A1 | 10/2007 | Dehaene et al. |
| 2007/0294986 A1 | 12/2007 | Beetz et al. |
| 2008/0031732 A1 | 2/2008 | Peer et al. |
| 2008/0039732 A9 | 2/2008 | Bowman |
| 2008/0095609 A1 | 4/2008 | Block et al. |
| 2008/0101918 A1 | 5/2008 | Block et al. |
| 2008/0101929 A1 | 5/2008 | Allen et al. |
| 2008/0115570 A1 | 5/2008 | Ante et al. |
| 2008/0116316 A1 | 5/2008 | Manfredotti et al. |
| 2008/0246281 A1 | 10/2008 | Agrawal et al. |
| 2008/0252162 A1 | 10/2008 | Post |
| 2008/0260539 A1 | 10/2008 | Stinessen et al. |
| 2008/0293503 A1 | 11/2008 | Vignal |
| 2008/0315812 A1 | 12/2008 | Balboul |
| 2008/0317584 A1 | 12/2008 | Murase et al. |
| 2009/0013658 A1 | 1/2009 | Borgstrom et al. |
| 2009/0015012 A1 | 1/2009 | Metzler et al. |
| 2009/0025562 A1 | 1/2009 | Hallgren et al. |
| 2009/0025563 A1 | 1/2009 | Borgstrom et al. |
| 2009/0046963 A1 | 2/2009 | Ozaki et al. |
| 2009/0151928 A1 | 6/2009 | Lawson |
| 2009/0159523 A1 | 6/2009 | McCutchen |
| 2009/0169407 A1 | 7/2009 | Yun |
| 2009/0173095 A1 | 7/2009 | Bhatia et al. |
| 2009/0173148 A1 | 7/2009 | Jensen |
| 2009/0266231 A1 | 10/2009 | Franzen et al. |
| 2009/0295244 A1 | 12/2009 | Ries |
| 2009/0302698 A1 | 12/2009 | Menz et al. |
| 2009/0304496 A1 | 12/2009 | Maier |
| 2009/0309439 A1 | 12/2009 | Yamamoto |
| 2009/0311089 A1 | 12/2009 | Begin et al. |
| 2009/0321343 A1 | 12/2009 | Maier |
| 2009/0324391 A1 | 12/2009 | Maier |
| 2010/0007133 A1 | 1/2010 | Maier |
| 2010/0007283 A1 | 1/2010 | Shimoyoshi et al. |
| 2010/0010701 A1 | 1/2010 | Gärtner |
| 2010/0021095 A1 | 1/2010 | Maier |
| 2010/0021292 A1 | 1/2010 | Maier et al. |
| 2010/0038309 A1 | 2/2010 | Maier |
| 2010/0043288 A1 | 2/2010 | Wallace |
| 2010/0043364 A1 | 2/2010 | Curien |
| 2010/0044966 A1 | 2/2010 | Majot et al. |
| 2010/0072121 A1 | 3/2010 | Maier |
| 2010/0074768 A1 | 3/2010 | Maier |
| 2010/0080686 A1 | 4/2010 | Teragaki |
| 2010/0083690 A1 | 4/2010 | Sato et al. |
| 2010/0090087 A1 | 4/2010 | Maier |
| 2010/0127589 A1 | 5/2010 | Kummeth |
| 2010/0129212 A1 | 5/2010 | Berger et al. |
| 2010/0139270 A1 | 6/2010 | Koch et al. |
| 2010/0143172 A1 | 6/2010 | Sato et al. |
| 2010/0163232 A1 | 7/2010 | Kolle |
| 2010/0180589 A1 | 7/2010 | Berger et al. |
| 2010/0183438 A1 | 7/2010 | Maier et al. |
| 2010/0239419 A1 | 9/2010 | Maier |
| 2010/0239437 A1 | 9/2010 | Maier et al. |
| 2010/0247299 A1 | 9/2010 | Maier |
| 2010/0257827 A1 | 10/2010 | Lane et al. |
| 2010/0310366 A1 | 12/2010 | Eguchi et al. |
| 2011/0017307 A1 | 1/2011 | Kidd et al. |
| 2011/0038716 A1 | 2/2011 | Frankenstein et al. |
| 2011/0044832 A1 | 2/2011 | Nijhuis |
| 2011/0052109 A1 | 3/2011 | Tecza et al. |
| 2011/0052432 A1 | 3/2011 | Cunningham et al. |
| 2011/0061536 A1 | 3/2011 | Maier et al. |
| 2011/0085752 A1 | 4/2011 | Tecza et al. |
| 2012/0106883 A1 | 5/2012 | Griffin |
| 2013/0015731 A1 | 1/2013 | Griffin et al. |

FOREIGN PATENT DOCUMENTS

| | | |
|---|---|---|
| DE | 692 17 540 T2 | 9/1997 |
| DE | 102 05 971 A1 | 11/2002 |
| EP | 1 300 600 A2 | 10/2002 |
| EP | 1 582 703 A2 | 10/2005 |
| EP | 0 875 694 B1 | 1/2006 |
| EP | 2 013 479 A0 | 1/2009 |
| EP | 7838631.5 | 12/2009 |
| GB | 2 323 639 A | 9/1998 |
| GB | 2 337 561 A | 11/1999 |
| JP | 54099206 | 1/1978 |
| JP | H 02-96016 U | 7/1990 |
| JP | H 06-173948 A | 6/1994 |
| JP | 08-068501 A | 3/1996 |
| JP | 08-082397 | 3/1996 |
| JP | 8-284961 A | 11/1996 |
| JP | H 09-74736 A | 3/1997 |
| JP | H 10-502722 A | 3/1998 |
| JP | 2001-124062 A | 5/2001 |
| JP | 2002-106565 A | 4/2002 |
| JP | 2002-218708 A | 8/2002 |
| JP | 2002-242699 A | 8/2002 |
| JP | 2004-034017 A | 2/2004 |
| JP | 2004-340248 A | 12/2004 |
| JP | 2005-291202 A | 10/2005 |
| JP | 3711028 B2 | 10/2005 |
| JP | 2007-162726 A | 6/2007 |
| KR | 94-702296 A | 1/1994 |
| KR | 10-1996-0065432 | 12/1996 |
| KR | 10-0207986 B1 | 7/1999 |
| KR | 10-2007-0106390 | 1/2007 |
| KR | 2009-0085521 A | 8/2009 |
| MX | 2008-012579 A | 12/2008 |
| WO | WO 95/13477 A1 | 5/1995 |
| WO | WO 95/24563 A1 | 9/1995 |
| WO | WO 01/17096 A1 | 3/2001 |

(56) References Cited

FOREIGN PATENT DOCUMENTS

| | | |
|---|---|---|
| WO | WO 01/57408 A1 | 8/2001 |
| WO | WO 2006/098806 A1 | 9/2006 |
| WO | WO 2007/043889 A1 | 4/2007 |
| WO | WO 2007/047976 A1 | 4/2007 |
| WO | 2007067169 A1 | 6/2007 |
| WO | WO 2007/103248 A2 | 9/2007 |
| WO | WO 2007/120506 A3 | 10/2007 |
| WO | WO 2008/036221 A3 | 3/2008 |
| WO | WO 2008/036394 A3 | 3/2008 |
| WO | WO 2008/039446 A3 | 4/2008 |
| WO | WO 2008/039491 A3 | 4/2008 |
| WO | WO 2008/039731 A3 | 4/2008 |
| WO | WO 2008/039732 A3 | 4/2008 |
| WO | WO 2008/039733 A2 | 4/2008 |
| WO | WO 2008/039734 A3 | 4/2008 |
| WO | WO 2009/111616 A3 | 9/2009 |
| WO | WO 2009/158252 A1 | 12/2009 |
| WO | WO 2009/158253 A1 | 12/2009 |
| WO | WO 2010/083416 A1 | 7/2010 |
| WO | WO 2010/083427 A1 | 7/2010 |
| WO | WO 2010/107579 A1 | 9/2010 |
| WO | WO 2010/110992 A1 | 9/2010 |
| WO | WO 2011/034764 A2 | 3/2011 |
| WO | WO 2011/044423 A2 | 4/2011 |
| WO | WO 2011/044428 A2 | 4/2011 |
| WO | WO 2011/044430 A2 | 4/2011 |
| WO | WO 2011/044432 A2 | 4/2011 |
| WO | WO 2011/088004 A2 | 7/2011 |
| WO | WO 2012/030459 A1 | 3/2012 |
| WO | WO 2012/138545 A2 | 10/2012 |
| WO | WO 2012/158266 A2 | 11/2012 |
| WO | WO 2012/166236 A1 | 12/2012 |

OTHER PUBLICATIONS

Atlas Bronze, "Graphite Lubricated Bearings," Website, 2 pages.
de Jongh, Frits, "The Synchronous Rotor Instability Phenomenon—Morton Effect," TurboCare B.V., Hengelo, The Netherlands, Proceedings of the 37th Turbomachinery Symposium, 2008, 9 pages.
Eichenberg, Dennis J., et al., "Development of a 32 Inch Diameter Levitated Ducted Fan Conceptual Design," (NASA/TM-2006-214481), *NASA, Glenn Research Center*, Cleveland, OH, Dec. 2006, 40 pages.
Liu, Kefu; Liu, Jie, and Liao, Liang, "Application of a Tunable Electromagnetic Damper in Suppression of Structural Vibration," (No. 04-CSME-49), *Department of Mechanical Engineering, Lakehead University*, Thunder Bay, Ontario Canada, received Oct. 2004, 21 pages.
Rodwell, E., "Auxiliary Bearings in Vertically Oriented Machines on Magnetic Bearings," (1003177), *EPRI*, Palo Alto, CA, 2001, 104 pages.
EP 03 00 9732—European Search Report, dated Sep. 9, 2003, 1 page.
EP 05 000 410.0—European Search Report, dated Mar. 9, 2005, 5 pages.
EP 03 009 732.3—Communication Pursuant to Article 96(2), dated Mar. 15, 2005, 1 page.
EP 06 817 242—Extended Supplementary European Search Report, dated Aug. 7, 2009, 3 pages.
EP 06 817 242—Supplementary European Search Report, dated Aug. 25, 2009, 1 page.
PCT/US2006/041127—International Preliminary Report on Patentability, Written Opinion of the International Searching Authority, issued Apr. 30, 2008, 4 pages.
PCT/US06/41127—Written Opinion of the International Searching Authority, mailed Mar. 19, 2007, 3 pages.
PCT/US2007/008149—International Preliminary Report on Patentability, issued Sep. 30, 2008, 4 pages.
PCT/US2007/008149—Written Opinion of the International Searching Authority, mailed Jul. 17, 2008, 3 pages.
PCT/US2007/020101—International Preliminary Report on Patentability, issued Mar. 24, 2009, 8 pages.
PCT/US2007/020101—Written Opinion of the International Searching Authority, mailed Apr. 29, 2008, 7 pages.
PCT/US2007/020471—International Preliminary Report on Patentability, issued Mar. 24, 2009, 6 pages.
PCT/US2007/020471—Written Opinion of the International Searching Authority, mailed Apr. 1, 2008, 5 pages.
PCT/US2007/020659—International Preliminary Report on Patentability, issued Mar. 31, 2009, 4 pages.
PCT/US2007/020659—Written Opinion of the International Searching Authority, mailed Sep. 17, 2008, 3 pages.
PCT/US2007/020768—International Preliminary Report on Patentability, issued Mar. 31, 2009, 8 pages.
PCT/US2007/020768—Written Opinion of the International Searching Authority, mailed Mar. 3, 2008, 7 pages.
PCT/US2007/079348—International Preliminary Report on Patentability, issued Mar. 31, 2009, 5 pages.
PCT/US2007/079348—Written Opinion of the International Searching Authority, mailed Apr. 11, 2008, 4 pages.
PCT/US2007/079349—International Preliminary Report on Patentability, issued Mar. 31, 2009, 5 pages.
PCT/US2007/079349—Written Opinion of the International Searching Authority, mailed Apr. 2, 2008, 4 pages.
PCT/US2007/079350—International Preliminary Report on Patentability, issued Mar. 31, 2009, 6 pages.
PCT/US2007/079350—International Search Report, mailed Apr. 2, 2008, 1 page.
PCT/US2007/079350—Written Opinion of the International Searching Authority, mailed Apr. 2, 2008, 5 pages.
PCT/US2007/079352—International Preliminary Report on Patentability, issued Mar. 31, 2009, 4 pages.
PCT/US2007/079352—Written Opinion of the International Searching Authority, mailed Apr. 27, 2008, 3 pages.
PCT/US2009/036142—International Preliminary Report on Patentability, issued Sep. 7, 2010, 8 pages.
PCT/US2009/036142—Notification of Transmittal of International Search Report and Written Opinion of International Searching Authority, International Search Report, mailed May 11, 2009, 3 pages.
PCT/US2009/036142—Written Opinion of the International Searching Authority, mailed May 11, 2009, 7 pages.
PCT/US2009/047662—International Preliminary Report on Patentability, issued Jan. 5, 2011, 6 pages.
PCT/US2009/047662—Written Opinion of the International Searching Authority, mailed Aug. 20, 2009, 5 pages.
PCT/US2009/047667—International Report on Patentability, issued Jan. 5, 2011, 5 pages.
PCT/US2009/047667—Written Opinion of the International Searching Authority, mailed Aug. 7, 2009, 4 pages.
PCT/US2009/047667—Notification of Transmittal of International Search Report and Written Opinion of the International Searching Authority, International Search Report, mailed Aug. 7, 2009, 3 pages.
PCT/US2010/021199—Notification of Transmittal of International Search Report and Written Opinion of International Searching Authority, International Search Report, Written Opinion of the International Searching Authority, mailed Mar. 22, 2010, 6 pages.
PCT/US2010/021199—International Preliminary Report on Patentability, issued Feb. 7, 2011, 10 pages.
PCT/US2010/021218—Notification of Transmittal of International Search Report and Written Opinion of International Searching Authority, International Search Report, Written Opinion of the International Searching Authority, mailed Mar. 23, 2010, 7 pages.
PCT/US2010/021218—International Report on Patentability, issued Jan. 26, 2011, 7 pages.
PCT/US2010/025650—Notification of Transmittal of International Search Report and Written Opinion of the International Searching Authority, International Search Report, Written Opinion of the International Searching Authority, mailed Apr. 22, 2010, 8 pages.
PCT/US2010/025650—International Report on Patentability, issued Mar. 3, 2011, 8 pages.

(56) References Cited

OTHER PUBLICATIONS

PCT/US2010/025952—Notification of Transmittal of International Search Report and Written Opinion of the International Searching Authority, International Search Report, Written Opinion of the International Searching Authority, mailed Apr. 12, 2010, 8 pages.
PCT/US2010/025952—International Report on Patentability, issued Mar. 4, 2011, 8 pages.
PCT/US2010/051922—Notification of Transmittal of International Search Report and Written Opinion of the International Searching Authority, International Search Report, Written Opinion of the International Searching Authority, mailed Jun. 30, 2011, 8 pages.
PCT/US2010/051927—Notification of Transmittal of International Search Report and Written Opinion of the International Searching Authority, International Search Report, Written Opinion of the International Searching Authority, mailed Jun. 30, 2011, 8 pages.
PCT/US2010/051930—Notification of Transmittal of International Search Report and Written Opinion of the International Searching Authority, International Search Report, Written Opinion of the International Searching Authority, mailed Jun. 30, 2011, 8 pages.
PCT/US2010/051932—Notification of Transmittal of International Search Report and Written Opinion of the International Searching Authority, International Search Report, Written Opinion of the International Searching Authority, mailed Jun. 30, 2011, 8 pages.
PCT/US2011/020746—Notification of Transmittal of International Search Report and Written Opinion of the International Searching Authority, International Search Report, Written Opinion of the International Searching Authority, mailed Sep. 23, 2011, 8 pages.
PCT/US2011/046045—Notification of Transmittal of International Search Report and Written Opinion of the International Searching Authority, International Search Report, Written Opinion of the International Searching Authority, mailed Feb. 17, 2012, 10 pages.
PCT/US2011/045987—Notification of Transmittal of International Search Report and Written Opinion of the International Searching Authority, International Search Report, Written Opinion of the International Searching Authority, mailed Mar. 21, 2012, 10 pages.
PCT/US2012/031237—International Search Report, Written Opinion of the International Searching Authority, mailed Nov. 1, 2012, 6 pages.
PCT/US12/31345—Notification of Transmittal of International Preliminary Report on Patentability, International Preliminary Report on Patentability, mailed May 20, 2013, 16 pages.
PCT/US2012/031345—Notification of Transmittal of International Search Report and Written Opinion of the International Searching Authority, International Search Report, Written Opinion of the International Searching Authority, mailed Oct. 31, 2012, 11 pages.
PCT/US2012/031240—International Search Report and Written Opinion mailed Oct. 19, 2012 (8 pages).

\* cited by examiner

CIRCULATING DIELECTRIC OIL COOLING SYSTEM FOR CANNED BEARINGS AND CANNED ELECTRONICS

The present application is a national stage application of PCT Pat. App. No. PCT/US2012/031240, filed Mar. 29, 2012, which claims priority to U.S. Provisional Patent Application having Ser. No. 61/473,467, which was filed Apr. 8, 2011. These priority applications are incorporated by reference in their entirety into the present application, to the extent that it is these priority applications are not inconsistent with the present application.

This application claims priority to U.S. Patent Application Ser. No. 61/473,467, which was filed Apr. 8, 2011. This priority application is hereby incorporated by reference in its entirety into the present application, to the extent that it is not inconsistent with the present application.

BACKGROUND

Magnetic bearings are used to levitate and support a rotor in a magnetic field and simultaneously provide stiffness and damping to the rotor. In some applications, especially subsea applications, magnetic bearings are often sealed within a housing or chamber to protect the bearings from external contamination. For example, bearings in subsea applications are constantly threatened by the ingress of sea water or other corrosive fluids that could prove fatal to the bearings if not adequately protected by the housing. Such a sealed bearing is generally known as a "canned" bearing.

The housing of a canned bearing also serves to protect the magnetic bearing from damaging external pressures. To prevent implosion or structural collapse from increased external pressures, the housing is often filled with a "potting material" such as a resin or an epoxy. The potting material fills in the voids around the poles, coils, windings, and instrumentation of the magnetic bearings, such as the position and temperature sensors, and hardens to form a solid structure. The potting material not only provides structural support to the housing to resist pressure escalations, but also acts as an electrical and thermal insulator for the bearings.

One drawback to conventional canned magnetic bearings, however, is the need to replace the entire bearing when an integral component fails. Because the potting material forms a hardened structure all about the magnetic bearing, simple repairs or replacements of bearing components, such as coils or poles, is essentially impossible. Instead, the canned magnetic bearing must be disposed of and replaced with a new bearing. Another drawback to conventional canned magnetic bearings is a poor heat transfer capacity. While magnetic bearings do not generate enormous amounts of heat, it is nonetheless beneficial to remove bearing heat in order to extend the life of the bearing. Canned magnetic bearings with potting material, however, depend heavily on conduction heat transfer which can be relatively inefficient since the heat is required to pass through the insulating potting material before being transferred to the external environment.

What is needed, therefore, is a cooling system for canned magnetic bearings that overcomes the disadvantages described above, and still provides for adequate support for the magnetic bearing.

SUMMARY

Embodiments of the disclosure may provide a cooling system for a rotating machine. The cooling system may include a first radial bearing housing arranged about a rotor and having a first radial magnetic bearing sealed therein for levitating the rotor, and a second radial bearing housing arranged about the rotor and having a second radial magnetic bearing sealed therein for levitating the rotor. The cooling system may further include a sealed controller can fluidly coupled to the first and second radial bearing housings and having a bearing control system disposed therein, and a coolant within the first and second radial bearing housings and the controller can such that the first and second radial magnetic bearings and the bearing control system are immersed in the coolant.

Embodiments of the disclosure may further provide a method for cooling a rotating machine. The method may include arranging a first radial bearing housing about a rotor, the first radial bearing housing having a first radial magnetic bearing sealed therein for levitating the rotor, and arranging a second radial bearing housing about the rotor, the second radial bearing housing having a second radial magnetic bearing sealed therein for levitating the rotor. The method may further include fluidly and sealingly coupling a controller can to the first and second radial bearing housings, the controller can having a bearing control system disposed therein, and immersing the first and second radial magnetic bearings and the bearing control system in a dielectric liquid coolant.

Embodiments of the disclosure may further provide another cooling system for a rotating machine. The other cooling system may include a first radial bearing housing arranged about a rotor and having a first radial magnetic bearing sealed therein for levitating the rotor, a first sealed conduit extending from the first radial bearing housing, and a second radial bearing housing arranged about the rotor and having a second radial magnetic bearing sealed therein for levitating the rotor. The cooling system may also include a second sealed conduit extending from the second radial bearing housing, and a controller can having a bearing control system disposed therein, the controller can being coupled to the first and second sealed conduits with first and second connectors that provide a pressure boundary between the controller can and the first and second sealed conduits. The cooling system may further include wiring extending from the bearing control system to the first and second radial bearing housings via the first and second sealed conduits, respectively, and a first coolant within the first and second radial bearing housings and the first and second sealed conduits, the first and second radial magnetic bearings and the wiring within the first and second sealed conduits being immersed in the first coolant. Lastly, the cooling system may include a second coolant within the controller can such that the bearing control system and wiring within the controller can are immersed in the second coolant.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
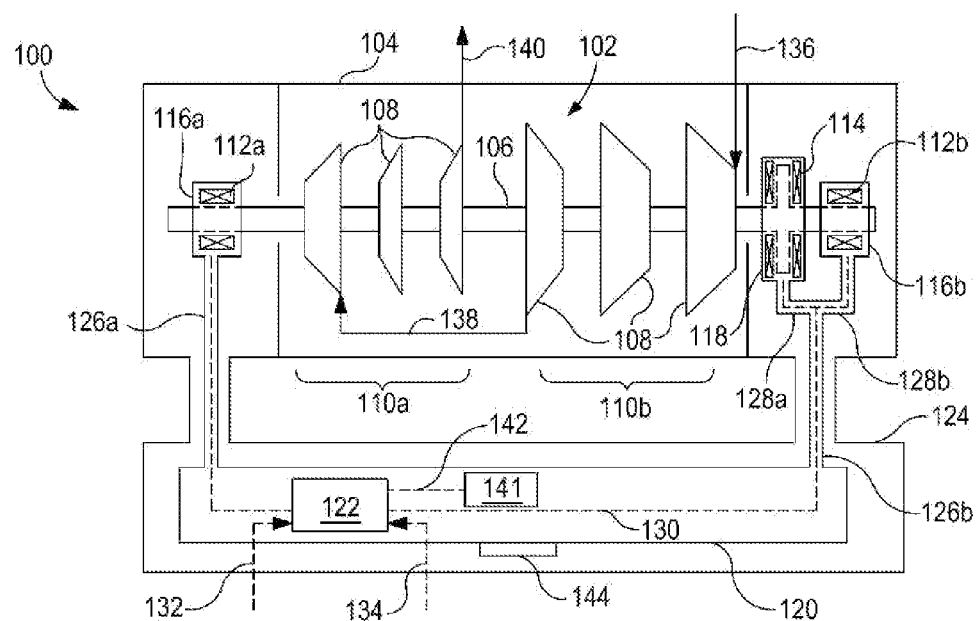
FIG. 1 illustrates a first cooling system for a rotating machine, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates an exemplary cooling system 100 for a rotating machine 102, according to one or more embodiments disclosed herein. In one embodiment, the rotating machine 102 may be a multistage centrifugal compressor, but in other embodiments, the rotating machine 102 may be any other type of rotating machinery, such as a canned pump or a turbine. As illustrated, the rotating machine 102 may include a casing 104 adapted to house the machine 102 components.

A rotor 106 may be arranged within the casing 104 and extend substantially the whole length thereof. In the case where the rotating machine 102 is a compressor, a plurality of impellers 108 may be mounted to the rotor 106 for rotation therewith. As illustrated, a total of six impellers 108 are mounted to the rotor 106, but it will be appreciated that any number of impellers 108 may be used without departing from the scope of the disclosure. The impellers 108 may be arranged in a back-to-back configuration, as illustrated, having a low pressure side 110b and a high pressure side 110a.

The rotor 106 may be supported or otherwise suspended for rotation by a first radial bearing 112a and a second radial bearing 112b positioned at or near the terminating ends of the rotor 106. In other embodiments, however, the rotor 106 may be supported with additional radial bearings positioned along the length of the rotor 106. Each radial bearing 112a,b may support to the rotor 106 and the successive stages of impellers 108 and provide dampening of rotordynamic anomalies. In one embodiment, each radial bearing 112a,b may be an active magnetic bearing. In other embodiments, however, one of the radial bearings 112a,b may be a passive magnetic bearing while the other is an active magnetic bearing. In addition, at least one axial thrust bearing 114 may be provided on the rotor 106 and positioned at or near an end thereof. In one embodiment, the axial thrust bearing 114 may be an active magnetic bearing and be configured to bear axial thrusts generated by the impellers 108. In other embodiments, the axial thrust bearing 114 may be a passive magnetic bearing. As illustrated, the axial thrust bearing 114 is arranged inboard from the second radial bearing 112b. In other embodiments, however, the axial thrust bearing 114 may be arranged outboard of the second radial thrust bearing 112b, without departing from the disclosure.

The cooling system 100 may include a first and second radial bearing housings 116a and 116b for housing the first and second radial bearings 112a and 112b, respectively. The cooling system 100 may further include an axial bearing housing 118 configured to house the axial thrust bearing 114. Each bearing housing 116a,b and 118 may be fluid-tight containers configured to seal the bearings 112a,b and 114 therein and shield the bearings from external contaminants such as process gas, liquids, oils, etc., which may potentially damage the bearings 112a,b and 114. Accordingly, each of the bearings 112a,b and 114 may be characterized as a type of "canned" bearing, where the bearing housings 116a,b and 118 are directly or indirectly supported by the casing 104.

The cooling system 100 may further include a controller can 120 adapted to house or otherwise seal a bearing control system 122 therein. Accordingly, the bearing control system 122 may be characterized as a canned bearing control system. In one embodiment, the controller can 120 may be housed or otherwise arranged in a separate portion 124 of the casing 104 but nonetheless in fluid communication with the remaining portions of the casing 104. In other embodiments, the controller can 120 may be arranged external to the casing 104, such as being attached to the exterior of the casing 104 or arranged proximal thereto.

The controller can 120 may be in fluid communication with each bearing housing 116a,b and 118 via first and second sealed conduits 126a and 126b. In other words, the controller can may be fluidly and sealingly coupled to each bearing housing 116a,b. As illustrated, the second sealed conduit 126b may be split and form two additional sealed conduits 128a and 128b that fluidly connect to the axial bearing housing 118 and the second radial bearing housing 116b, respectively. In one embodiment, the sealed conduits 126a and 128a,b may be coupled to the corresponding bearing housings 116a, 118, and 116b with compression fittings or flange connections. In other embodiments, however, the sealed conduits 126a and 128a,b may be welded directly to the corresponding bearing housings 116a, 118, and 116b. In yet other embodiments, the various connections may be made with a combination of compression fittings, flange connections, and/or welding. Likewise, each sealed conduit 126a,b may be coupled to the controller can 120 with compression fittings, flange connections, welding, or combinations thereof.

The bearings 112a,b and 114 may be controlled jointly or separately by the bearing control system 122. To accomplish this, the bearing control system 122 may be communicably coupled to one or all of the bearings 112a,b and 114 via wiring 130 that extends from the bearing control system 122, through each sealed conduit 126a,b and 128a,b, and eventually to each bearing 112a,b and 114. The wiring 130 also provides the necessary power to operate the bearings 112a,b and 114. External power is provided to the bearing control system 122 via line 132 may penetrate the separate portion 124 of the casing 104 and the controller can 120. Also, a communications link 134 may be provided to the control system 122 to supply instructions for the operation of the bearings 112a,b and 114 and to report general conditions of the system 100 to a user. In one embodiment, the communications link 134 may be an Ethernet link, or any other suitable communications link. In other embodiments, however, the communications link 134 does not penetrate the casing 104 or controller can 120, but instead communication signals may be sent and received via a light source through a quartz or glass window (e.g., a fiber optic window) integrally-formed into the casing 104.

In operation, the rotor 106 is driven and the impellers 108 simultaneously rotate. A process gas may be introduced into the machine 102 via an inlet 136. The process gas may include, but is not limited to, a mixture of hydrocarbon gas, such as natural gas or methane derived from a production field or via a pressurized pipeline. In other embodiments, the process gas may include air, $CO_2$, $N_2$, ethane, propane, i-$C_4$, n-$C_4$, i-$C_5$, n-$C_5$, and/or combinations thereof. The impellers 108 in the low pressure side 110b may be configured to receive the process gas and direct a partially pressurized process gas to the high pressure side 110a via a conduit 138. The impellers 108 in the high pressure side 110a may be configured to increase the pressure of the process gas received from the low pressure side 110b and discharge a high pressure process gas from the casing 104 via a discharge 140.

As the rotor 106 rotates, heat may be generated by one or more of the bearings 112a,b and 114 and/or the bearing control system 122. To reduce or otherwise dissipate the heat generated, the bearing housings 116a,b and 118 and the controller can 120 may each be filled with a coolant. Consequently, the bearings 112a,b and 114 and the bearing control system 122 may be entirely immersed in the coolant. The sealed conduits 126a,b 128a,b may also be filled with the coolant, thereby entirely immersing the wiring 130 and also providing fluid communication between the bearing housings 116a,b and 118 and the controller can 120.

In one embodiment, the coolant is a dielectric liquid coolant, such as FLUORINERT® cooling liquids commercially-available from 3M®. In other embodiments, the dielectric liquid coolant may include mineral oil, silicone oil, natural ester-based oils (including soybean-based oils), synthetic ester-based oils, TRANSIL™ oils, BETA FLUID™ (available from Dielectric Systems, Inc.), ENVIROTEMP® (available from Cooper Power Systems, Inc.), and/or combinations thereof or the like. In yet other embodiments, the coolant is a dielectric fluid that is a gas such as, but not limited to, clean air, nitrogen, and other inert gases (e.g., argon or neon).

The bearings 112a,b and 114 and the control system 122 may be cooled by convection heat transfer through the surrounding coolant throughout the cooling system 100. The coolant may transfer any generated heat to the bearing housings 116a,b and 118 and the controller can 120 to be transferred to the external environment. In one embodiment, an in-line pump 140 may be included in the cooling system 100 to circulate the coolant and thereby increase the heat transfer rate. In other embodiments, any suitable pump may be used to circulate the coolant, such as a blower. The pump 141 may be arranged in any part of the system 100, but may in at least one embodiment be placed in the controller can 120. The pump 141 may be powered and controlled by the control system 122 via line 142.

The fluid pressure in the cooling system 100 may be regulated with at least one pressure equalizer 144. In one embodiment, the pressure equalizer 144 may be coupled to the controller can 120 and powered and controlled by the control system 122. The pressure equalizer 144 may include any type of pressure equalizing or regulating device, such as an equalizing bellows or the like.

In operation, the pressure equalizer 144 may be configured to maintain the pressure in the controller can 120 and bearing housings 116a,b and 118 generally equal to the inlet pressures of the rotating machine 102. As the pressure equalizer 144 operates, the pressure in the cooling system 100 is maintained such that there is little or no net pressure differential between the interior of the casing 104 and the interior of controller can 120 and bearing housings 116a,b and 118. Consequently, the pressure equalizer 144 may be configured to prevent the implosion of the controller can 120 and bearing housings 116a,b and 118 by external pressures present in the interior of the casing 104 and surrounding environment.

Figure 2:
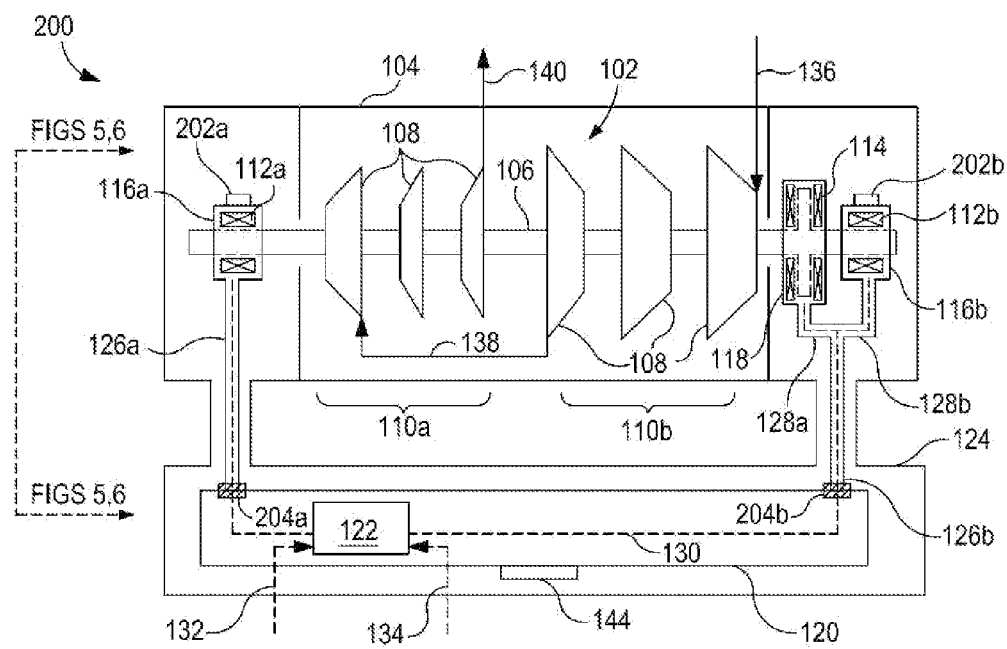
FIG. 2 illustrates a second cooling system for a rotating machine, according to one or more embodiments disclosed.

Referring now to FIG. 2, illustrated is another exemplary cooling system 200 that may be implemented to cool portions of the rotating machine 102, according to one or more embodiments disclosed. The cooling system 200 is similar in several respects to the cooling system 100 of FIG. 1. Accordingly, the cooling system 200 may be best understood with reference to FIG. 1, where like numerals correspond to like components and therefore will not be described again in detail. Similar to the cooling system 100 described above, the bearing housings 116a,b and 118 may be filled with a coolant, such as a dielectric fluid, thereby immersing the bearings 112a,b and 114 in the coolant to regulate the temperature of each bearing 112a,b and 114. In one embodiment, the dielectric fluid is a dielectric liquid coolant, such as those described above with reference to FIG. 1. The sealed conduits 126a,b may also be filled with the dielectric fluid, thereby providing fluid communication between the first sealed conduit 126a and the first radial bearing housing 116a, and fluid communication between the second sealed conduit 126b and the second radial bearing housing 116b and axial bearing housing 118.

The pressure in each bearing housing 116a,b and 118 may be regulated by one or more pressure equalizers, such as first and second pressure equalizers 202a and 202b. As illustrated, the pressure equalizers 202a,b may be fluidly coupled to the bearing housings 116a,b, respectively. In other embodiments, however, the pressure equalizers 202a,b may be fluidly coupled to any other portion of the cooling system 200 in fluid communication with the bearing housings 116a,b and 118. Similar to the pressure equalizer 144 described above with reference to FIG. 1, the pressure equalizers 202a,b may include an equalizing bellows or other similar pressure regulating devices. In operation, the pressure equalizers 202a,b may be configured to prevent the general implosion of each bearing housing 116a,b and 118 by avoiding pressure differentials between the interior of the casing 104 and the interior of each bearing housing 116a,b and 118.

For example, the first radial bearing housing 116a may be pressurized by the first pressure equalizer 202a to withstand the surrounding, adjacent pressures within the casing 104 or, in other words, the inlet pressure of the nearest impeller 108 in the high-pressure side 110a. Likewise, the second radial bearing housing 112b and axial bearing housing 118 may be pressurized by the second pressure equalizer 202b to withstand the surrounding, adjacent pressures within the casing 104 or, in other words, the inlet pressure of the nearest impeller 108 in the low-pressure side 110b (e.g., the fluid pressure of the inlet 136).

The cooling system 200 may also include connectors 204a and 204b that couple the controller can 120 to the first and second sealed conduits 126a and 126b, respectively. Each connector 204a,b may be configured as a pressure boundary that separates the coolant in the bearing housings 116a,b and 118 from a different coolant within the controller can 120. For example, the controller can 120 may be filled with a gas that immerses the bearing control system 122 in a benign, non-corrosive environment. In one embodiment, the gas within the controller can 120 may also be a dielectric fluid, such as clean air, nitrogen, or other inert gases (e.g., argon) that facilitate convection heat transfer from the bearing control system 122 to the external environment.

The pressure equalizer 144 may be used to equalize the pressure the controller can 120 to the pressure within the separate portion 124 of the casing 104, thereby avoiding potential implosion of the controller can 120. In other embodiments, however, the pressure equalizer 144 may maintain the pressure in the controller can 120 at approximately ambient pressure, thereby protecting the bearing control system from damage caused by extreme pressures. Such an embodiment may prove advantageous in applications where the bearing control system 122 is required to remain dry, but nonetheless kept in a non-corrosive environment at a specific pressure.

Figure 3:
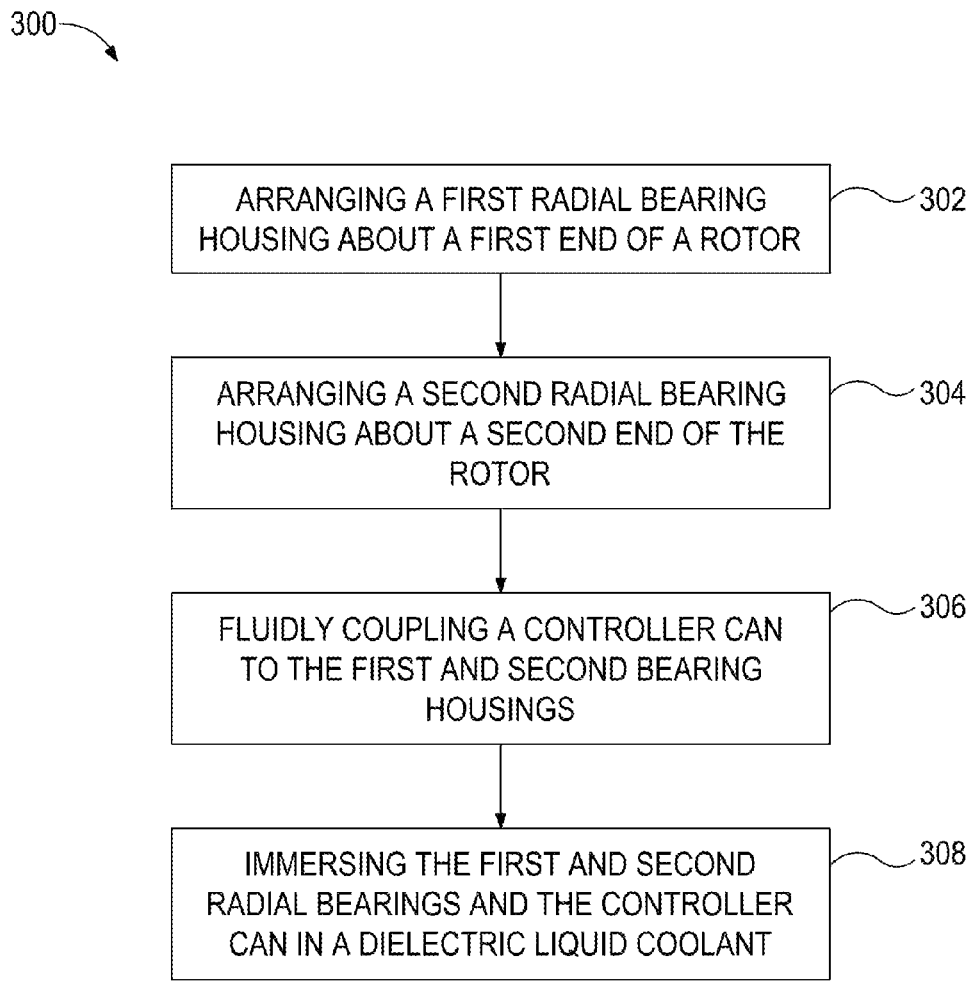
FIG. 3 illustrates a flowchart of a method for cooling a rotating machine, according to one or more embodiments disclosed.

Referring now to FIG. 3, illustrated is a flowchart of a method 300 for cooling a rotating machine. The method 300 may include arranging a first radial bearing housing about a first end of a rotor, as at 302. The first radial bearing housing may have a first radial magnetic bearing sealed therein for levitating the first end of the rotor. A second radial bearing housing may be arranged about a second end of the rotor, as at 304. The second radial bearing housing may have a second radial magnetic bearing sealed therein for levitating the second end of the rotor. The method may further include fluidly coupling a controller can to the first and second radial bearing housings, as at 306. In one embodiment, the controller can has a bearing control system disposed therein for controlling the first and/or second radial bearings. The first and second radial magnetic bearings and the bearing control system may then be immersed in a dielectric liquid coolant, as at 308. The dielectric liquid coolant may be configured to facilitate convection heat transfer from the bearings and bearing control system to the external environment.

Figure 4:
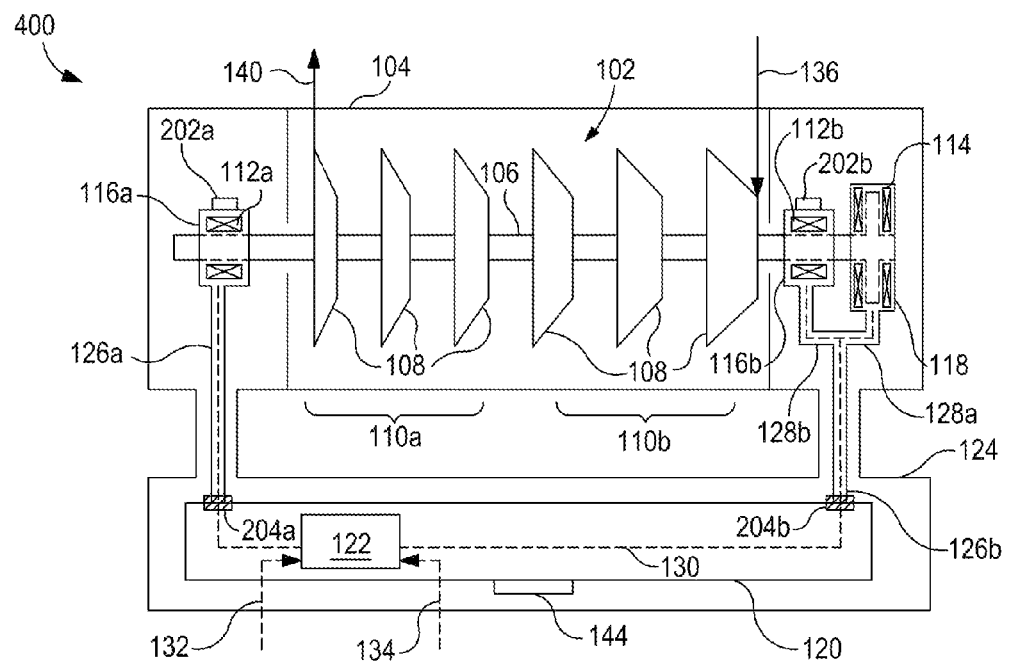
FIG. 4 illustrates a third cooling system for a rotating machine, according to one or more embodiments disclosed.

Referring now to FIG. 4, illustrated is another exemplary cooling system 400 that may be implemented to cool portions of the rotating machine 102. The cooling system 400 is similar in several respects to the cooling systems 100 and 200 of FIGS. 1 and 2, respectively, and therefore may be best understood with reference to FIGS. 1 and 2, where like numerals correspond to like components and therefore will not be described again in detail. The rotating machine 102 of the cooling system 400 may be a straight-through compressor or pump having a plurality of impellers 108 (in this case, six) configured to successively compress a process gas. The number of impellers 108 may be more or less than illustrated, depending on the application or size of the machine 102. As with prior embodiments, the process gas enters the stages of impellers 108 via the suction inlet 136 and exits the rotating machine 102 via the discharge 140.

The cooling system 400 may also have the axial thrust bearing 114 disposed outboard from the second radial bearing 112b, such that the sealed conduit 128a is fluidly coupled to the second radial bearing housing 116a and the sealed conduit 128b is fluidly coupled to the axial bearing housing 118. In other embodiments, the axial thrust bearing 114 may be arranged on the opposite side of the machine 102 and axially adjacent the first radial bearing 112a.

It will be appreciated that the features of the system 400 described above may be equally applicable in any of the systems disclosed herein. Also, any combination of the several features of the systems described herein may be had in any single embodiment, without departing from the scope of the disclosure.

Figure 5:
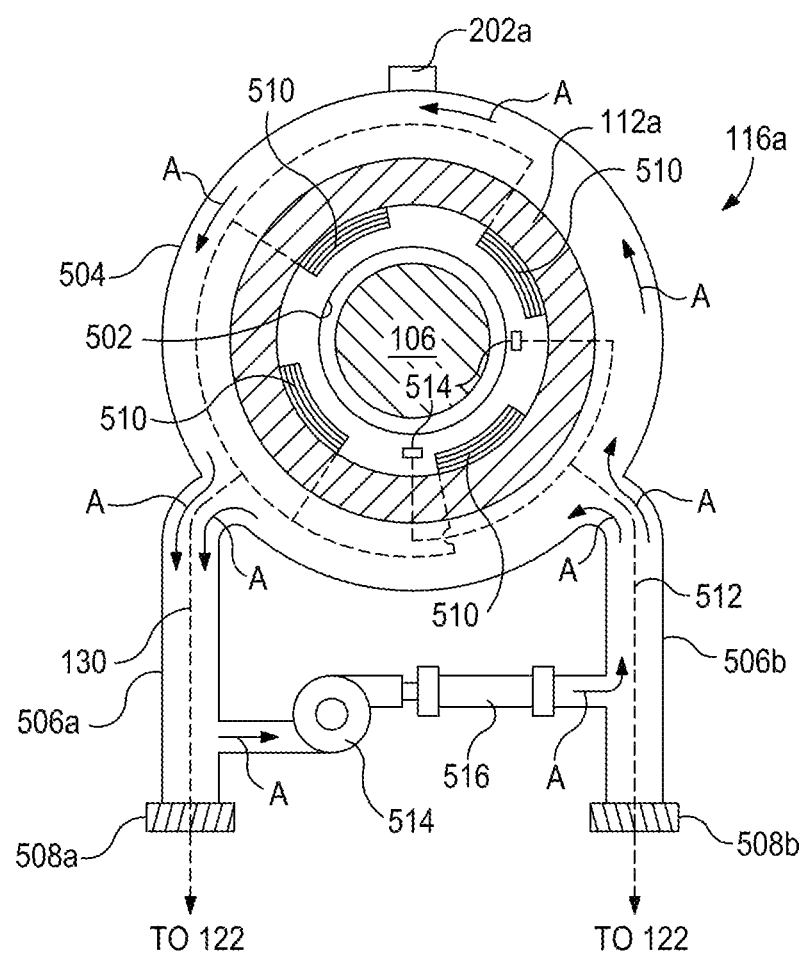
FIG. 5 illustrates a partial end view of the cooling system of FIG. 2, according to one or more embodiments disclosed.

Referring to FIG. 5, illustrated is a partial end view of the first radial bearing 112a enclosed in the first radial bearing housing 116a, taken along the lines shown in FIG. 2. Also shown is a cross-sectional view of the rotor 106 surrounded by the first radial bearing 112a. Specifically, the radial bearing housing 116a has an inside surface 502 and an outer surface 504, where the inside surface 502 is radially-offset from the rotor 106. It will be appreciated that the following discussion, elements, and processes will be equally applicable to the second radial bearing 112b and accompanying second radial bearing housing 116a. Moreover, the elements and processes described below with reference to FIG. 5 may also be applied to the axial thrust bearing 114 and accompanying thrust bearing housing 118, without departing from the scope of the disclosure.

In the illustrated embodiment, the first sealed conduit 126a may include or otherwise be shown as parallel sealed conduits 506a and 506b, each fluidly coupled to the bearing housing 116a and terminating at parallel connectors 508a and 508b. The parallel connectors 508a,b may be substantially similar to the first connector 204a, as described above with reference to FIG. 2, and may couple the corresponding parallel sealed conduits 506a,b to the controller can 120 (not shown).

The radial bearing 112a may be an active magnetic bearing having a plurality of coils 510 (four shown) circumferentially-spaced about the inner-radial surface thereof. The coils 510 may be provided with power for levitating the shaft via the wiring 130. Specifically, the wiring 130 extends from each coil 510 through either sealed conduit 506a,b and corresponding connector 508a,b. Once extended through either connector 508a,b, the wiring 130 may be directed to the bearing control system 122, as described above with reference to FIGS. 1 and 2.

The wiring 130 may further include sensor wiring 512 extending from a pair of sensors 514 disposed within the radial bearing housing 116a. As known in the art, the sensors 514 may be configured to sense the general location of the rotor 106 and send signals to the bearing control system 122 to adjust the power output from various coils 510 in order to maintain the rotor 106 centrally-located within the radial bearing 112a. Accordingly, the sensor wiring 512 may extend through either sealed conduit 506a,b and corresponding connector 508a,b and thereafter be directed to the bearing control system 122.

The radial bearing 112a may be cooled by natural convection within the bearing housing 116a which rejects heat to the exterior. To aid in the natural convection process, the radial bearing housing 116a may be fluidly coupled to a pump 514 and a heat exchanger 516. The pump 514 may be configured to circulate the coolant throughout the bearing housing 116a and sealed conduits 506a,b, as indicated by arrows A. The heat exchanger 516 may be any device adapted to reduce the temperature of a fluid such as, but not limited to, a direct contact heat exchanger, a gas-to-gas heat exchanger, a trim cooler, a mechanical refrigeration unit, and/or any combination thereof. Accordingly, as the coolant is circulated with the pump 514, it is simultaneously cooled in the heat exchanger 516 and helps to pull heat away from the radial bearing 112a by forced convection cooling.

Figure 6:
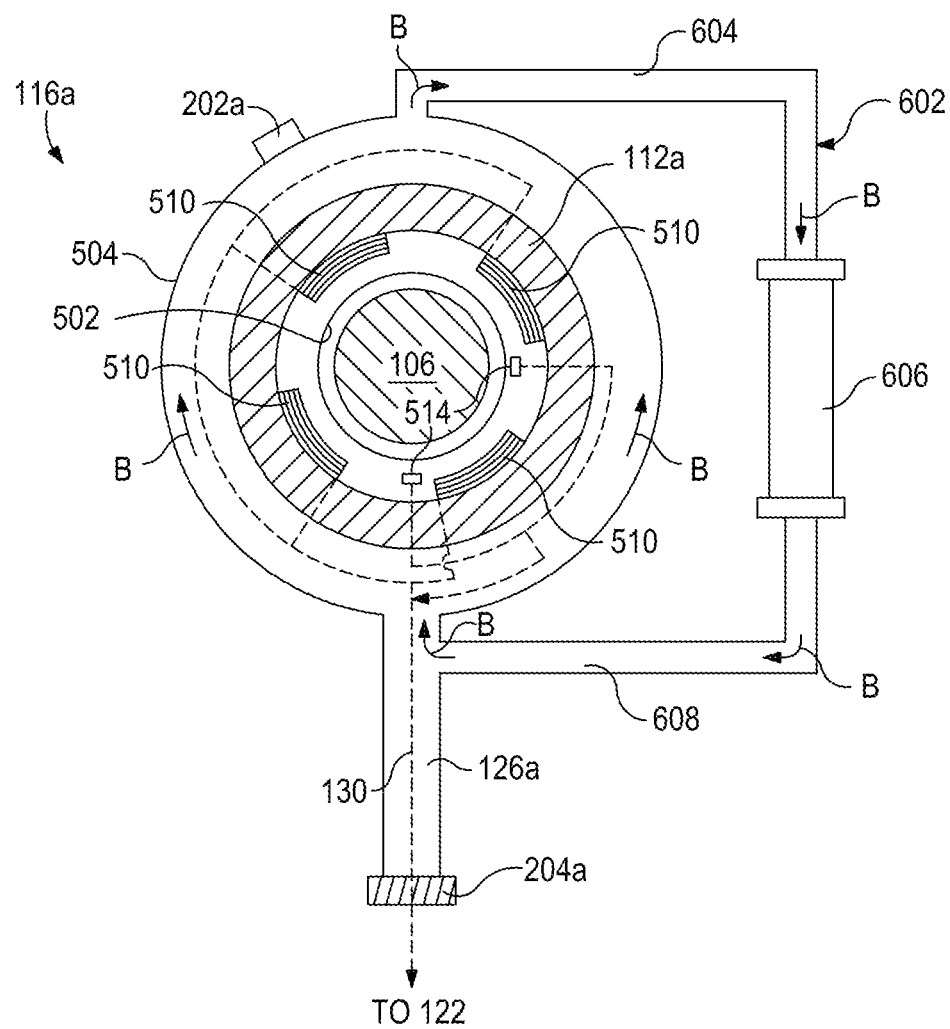
FIG. 6 illustrates an alternative partial end view of the cooling system of FIG. 2, according to one or more embodiments disclosed.

Referring now to FIG. 6, illustrated is another partial end view of the first radial bearing 112a enclosed in the first radial bearing housing 116a, taken along the lines shown in FIG. 2. FIG. 6 may be best understood with reference to FIGS. 1, 2, and 5, where like numerals correspond to like elements and therefore will not be described again in detail. The radial bearing housing 116a shown in FIG. 6 may be fluidly coupled to a natural convection loop 602 configured to cool the coolant within the bearing housing 116a. The convection loop 602 may include a warm fluid line 604 fluidly coupled to a heat exchanger 606 and adapted to direct warmed coolant from the bearing housing 116a to the heat exchanger 606 for cooling. The heat exchanger 606 may be substantially similar to the heat exchanger 516 described above with reference to FIG. 5. The heat exchanger 606 may discharge a cooled coolant into a cooled fluid line 608 which directs the coolant back into the bearing housing 116a to circulate as indicated by arrows B.

Baffling and flow passages (not shown) may also be included in the bearing housing 116a to distribute the coolant and maximize convection heat transfer. In one embodiment, the heat exchanger 606 may be located externally from the casing 104 (FIGS. 1, 2, and 5) and rely on the environment to cool the coolant. This may be particularly advantageous in subsea applications where the sea water may be used to cool the coolant in a heat exchanger receiving sea water as a cooling medium. In other embodiments, the heat exchanger 606 may be in fluid communication with a process gas of the rotating machine 102 (FIGS. 1,2, and 5). For example, the heat exchanger 606 may be a gas-to-gas heat exchanger and adapted to receive the process fluid and transfer heat from the coolant to the process gas in order to cool the coolant. The source of the process gas may be the suction process gas at the suction inlet 136 (FIGS. 1,2, and 5), but in other embodiments, the source of the process gas may be the discharge process gas exiting the rotating machine 102 via the discharge outlet 140 (FIGS. 1,2, and 5).

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:
1. A cooling system for a rotating machine, comprising:
   a first radial bearing housing arranged about a rotor and having a first radial magnetic bearing sealed therein for levitating the rotor;
   a second radial bearing housing arranged about the rotor and having a second radial magnetic bearing sealed therein for levitating the rotor;
   a sealed controller can fluidly coupled to the first and second radial bearing housings and having a bearing control system disposed therein; and
   a coolant within the first and second radial bearing housings and the controller can such that the first and second radial magnetic bearings and the bearing control system are immersed in the coolant.
2. The system of claim 1, wherein the coolant within the first and second radial bearing housings is a dielectric cooling liquid and the coolant within the controller can is a dielectric gas.
3. The system of claim 1, wherein the coolant is a dielectric cooling liquid.
4. The system of claim 1, further comprising:
   a first sealed conduit providing fluid communication between the controller can and the first radial bearing housing;
   a second sealed conduit providing fluid communication between the controller can and the second radial bearing housing; and
   wiring extending from the bearing control system to the first and second radial bearing housings via the first and second sealed conduits, respectively, the wiring being immersed in the coolant and configured to control the first and second radial magnetic bearings.
5. The system of claim 4, wherein the second sealed conduit is split to form a third sealed conduit and a fourth sealed conduit, the fourth sealed conduit being in fluid communication with the second radial bearing housing.
6. The system of claim 5, further comprising an axial bearing housing arranged about the rotor and having an axial magnetic thrust bearing sealed therein and immersed in the coolant, the axial bearing housing being in fluid communication with the controller can via the third and second sealed conduits.
7. The system of claim 1, further comprising a pump disposed within the controller can and configured to circulate the coolant through the first and second radial bearing housings and the controller can.
8. The system of claim 1, further comprising a pressure equalizer configured to regulate fluid pressure inside the first and second radial bearing housings and the controller can.
9. The system of claim 8, wherein the pressure equalizer is an equalizing bellows.
10. A method for cooling a rotating machine, comprising:
   arranging a first radial bearing housing about a rotor, the first radial bearing housing having a first radial magnetic bearing sealed therein for levitating the rotor;

arranging a second radial bearing housing about the rotor, the second radial bearing housing having a second radial magnetic bearing sealed therein for levitating the rotor;

fluidly and sealingly coupling a controller can to the first and second radial bearing housings, the controller can having a bearing control system disposed therein; and immersing the first and second radial magnetic bearings and the bearing control system in a dielectric liquid coolant.

11. The method of claim 10, further comprising:

controlling the first and second radial bearings with the bearing control system, the bearing control system being communicably coupled to the first radial bearing via a first length of wiring that extends from the bearing control system through a first sealed conduit, the bearing control system also being communicably coupled to the second radial bearing via a second length of wiring that extends from the bearing control system through a second sealed conduit; and immersing the first and second lengths of wiring in the dielectric liquid coolant.

12. The method of claim 11, further comprising circulating the dielectric liquid coolant with a pump through the first and second radial bearing housings and the controller can.

13. The method of claim 11, further comprising regulating a liquid pressure of the dielectric liquid coolant in the first and second radial bearing housings and the controller can with a pressure equalizer.

14. The method of claim 11, further comprising:

arranging an axial bearing housing about the rotor, the axial bearing housing having an axial magnetic thrust bearing sealed therein and in fluid communication with the controller can; and immersing the axial magnetic thrust bearing in the dielectric liquid coolant.

15. A cooling system for a rotating machine, comprising:

a first radial bearing housing arranged about a rotor and having a first radial magnetic bearing sealed therein for levitating the rotor;

a first sealed conduit extending from the first radial bearing housing;

a second radial bearing housing arranged about the rotor and having a second radial magnetic bearing sealed therein for levitating the rotor;

a second sealed conduit extending from the second radial bearing housing;

a controller can having a bearing control system disposed therein, the controller can being coupled to the first and second sealed conduits with first and second connectors that provide a pressure boundary between the controller can and the first and second sealed conduits;

wiring extending from the bearing control system to the first and second radial bearing housings via the first and second sealed conduits, respectively;

a first coolant within the first and second radial bearing housings and the first and second sealed conduits, the first and second radial magnetic bearings and the wiring within the first and second sealed conduits being immersed in the first coolant; and a second coolant within the controller can such that the bearing control system and wiring within the controller can are immersed in the second coolant.

16. The system of claim 15, wherein the first coolant is a dielectric cooling liquid.

17. The system of claim 15, wherein the second coolant is a dielectric gas.

18. The system of claim 15, further comprising:

a first pressure equalizer fluidly coupled to the first radial bearing housing and configured to regulate fluid pressure within the first radial bearing housing and the first sealed conduit; and a second pressure equalizer fluidly coupled to the second radial bearing housing and configured to regulate fluid pressure within the second radial bearing housing and the second sealed conduit.

19. The system of claim 15, wherein the second sealed conduit is split to form a third sealed conduit and a fourth sealed conduit, the fourth sealed conduit being in fluid communication with the second radial bearing housing.

20. The system of claim 19, further comprising an axial bearing housing arranged about the rotor and having an axial magnetic thrust bearing sealed therein and immersed in the first coolant.

* * * * *